No. 673,944. Patented May 14, 1901.
J. G. DOTY.
MEASURING INSTRUMENT.
(Application filed Mar. 5, 1901.)

(No Model.)

Inventor
Jerald G. Doty

Witnesses

By
Attorneys

THE NORRIS PETERS CO., PHOTO-LITHO., WASHINGTON, D. C.

UNITED STATES PATENT OFFICE.

JERALD G. DOTY, OF BASCO, ILLINOIS.

MEASURING INSTRUMENT.

SPECIFICATION forming part of Letters Patent No. 673,944, dated May 14, 1901.

Application filed March 5, 1901. Serial No. 49,803. (No model.)

*To all whom it may concern:*

Be it known that I, JERALD G. DOTY, a citizen of the United States, residing at Basco, in the county of Hancock and State of Illinois, have invented certain new and useful Improvements in Measuring Instruments; and I do declare the following to be a full, clear, and exact description of the invention, such as will enable others skilled in the art to which it appertains to make and use the same.

This invention relates to a self indicating or registering measuring instrument, and aims to provide a simple and effective device of this character designed for use as calipers, and in addition as a gage for finding with accuracy the outside circumference of bodies and the inside circumference of circular openings.

The invention consists of certain novel features of construction and combination of parts, which will be hereinafter more fully described and claimed, and illustrated in the accompanying drawings, in which—

Figure 1:
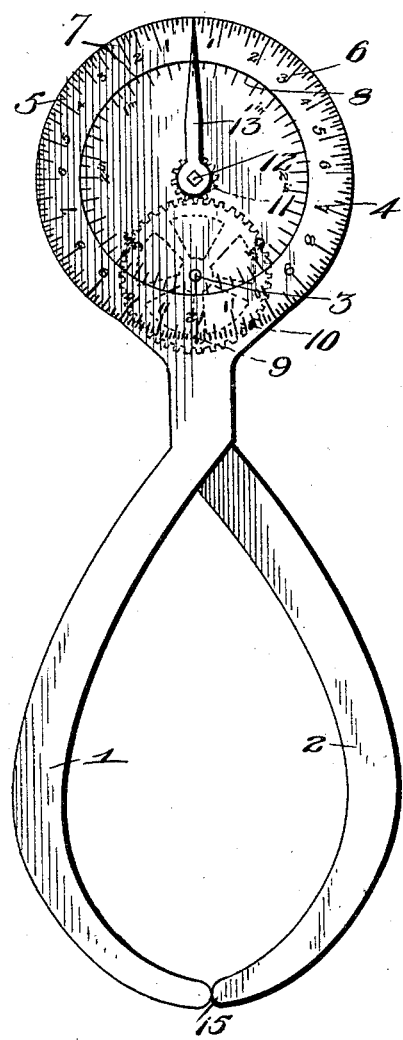
Figure 2:
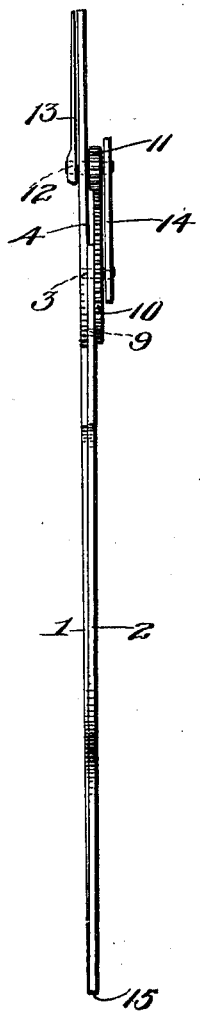

Figure 1 is a front elevational view of a measuring instrument constructed in accordance with the invention, and Fig. 2 is a side elevation of the same.

Referring now more particularly to the drawings, the numerals 1 and 2 represent the curved legs of the instrument, which are arranged to overlap and to slide past one another and are pivotally connected by the pin 3. To the upper end of the leg 1 is fixed a circular dial or disk 4, which is provided upon its front face with a series of scales for determining measurements. These scales extend around the disk, near the outer edge thereof, and in opposite directions from the central vertical line of the disk. Upon the left of the center of the disk is arranged a scale 5 for measuring the inside circumference of circular openings, and upon the right-hand portion of the disk is similarly arranged a scale 6 for measuring the circumference of bodies. Inside these scales are two other scales, 7 and 8, arranged to extend to the right and left of a neutral point located in the vertical line of the axis of the disk, the scale 7 being employed for measuring the inside diameter of circular openings and the scale 8 for measuring the diameters of bodies.

To the leg 2 of the instrument is rigidly secured, as by means of a pin 9, a spur gear-wheel 10, which is mounted on the pivot 3. This gear meshes with a pinion 11 on a shaft or pivot 12, which also carries a hand or pointer 13, which is adapted to traverse the face of the dial to coöperate with either of the aforesaid scales. The pivot pins or shafts 3 and 12 are mounted in the dial or disk 4 and in the back plate 14, which serves as a seat or reinforce to maintain the parts in proper relation.

The operation of the device is as follows: When the points 15 of the legs open, the gear 10 being fastened to the leg 2 turns the pinion 11, to which is fastened the hand or pointer 13, which moves to the right over the scale 6 and coöperates therewith to indicate the outside circumference of the body being measured. In thus moving to the right the hand or pointer is also adapted to coöperate with the scale 8 to indicate the diameter of an object, the ratio that exists between the scale 7 and the scale 5 being 1 to 3.1416. As stated, the legs are arranged to slide or move past one another, and in thus operating them to cause the points 15 to pass the gear and pinion will be operated to move the hand or pointer to the left to coöperate with the scale 5 to indicate the inside circumference of a circular opening or to coöperate with the scale 7 to indicate the inside diameter of a circular opening.

It will thus be seen that the invention provides a simple and effective form of instrument which is adapted for use as calipers and in addition as a gage for finding the outside circumference of bodies and the inside circumference of circular openings. The instrument may be made of different sizes for the use of different mechanics, as the same effect will be produced if the proportions of the parts of the dial are maintained throughout a set of instruments of different sizes.

While the preferred form of the invention is as herein described, it will of course be understood that various changes in the form, proportion, and minor details of construction may be made within the scope of the invention without departing from the spirit or sacrificing any of the advantages thereof.

Having thus fully described my invention, what I claim as new, and desire to secure by Letters Patent, is—

1. A measuring instrument comprising pivoted legs, a dial carried by one of the legs and provided with scales for indicating, respectively, the diameter and outside circumference of bodies and the inside diameter and circumference of circular openings, a hand or pointer adapted to move across the face of the dial and coöperate with said scales, and gearing operated through the movement of the other leg of the instrument for actuating said pointer, substantially as set forth.

2. A measuring instrument comprising a pair of pivoted legs, one of which is provided with a fixed dial or disk having two sets of scales disposed upon opposite sides of the vertical axial line thereof to indicate the outside circumference and diameter of bodies and the inside circumference and diameter of circular openings, a back plate, a pivot-pin passed through the back plate, the dial, and the other leg of the instrument and pivotally connecting said parts, a gear-wheel mounted on said pin and rigidly connected to the latter-named leg of the instrument, a second pivot-pin passed through the back plate and dial and carrying a pinion meshing with said gear, and a hand also carried by said pivot-pin and adapted to traverse the face of the dial and to coöperate with said scales, substantially as set forth.

In testimony whereof I have hereunto set my hand in presence of two subscribing witnesses.

JERALD G. DOTY.

Witnesses:
M. P. BERRY,
CHAS. L. STEFFEY.